United States Patent
Hagimoto et al.

(10) Patent No.: US 10,358,354 B2
(45) Date of Patent: Jul. 23, 2019

(54) CRYSTALLINE SILICA PARTICULATE MATERIAL AND PRODUCTION PROCESS FOR THE SAME AS WELL AS CRYSTALLINE SILICA PARTICULATE MATERIAL-CONTAINING SLURRY COMPOSITION AND CRYSTALLINE SILICA PARTICULATE MATERIAL-CONTAINING RESINOUS COMPOSITION

(71) Applicant: ADMATECHS CO., LTD., Miyoshi-shi (JP)

(72) Inventors: Shinta Hagimoto, Miyoshi (JP); Nobutaka Tomita, Miyoshi (JP)

(73) Assignee: ADMATECHS CO., LTD., Miyoshi-shi (JP)

(*) Notice: Subject to any disclaimer, the term of this patent is extended or adjusted under 35 U.S.C. 154(b) by 0 days.

(21) Appl. No.: 16/169,268

(22) Filed: Oct. 24, 2018

(65) Prior Publication Data
US 2019/0055132 A1 Feb. 21, 2019

Related U.S. Application Data

(63) Continuation of application No. PCT/JP2017/016495, filed on Apr. 26, 2017.

(30) Foreign Application Priority Data

Apr. 28, 2016 (JP) ................. 2016-091877

(51) Int. Cl.
*C08J 3/11* (2006.01)
*C08K 3/36* (2006.01)
(Continued)

(52) U.S. Cl.
CPC ............... *C01B 33/18* (2013.01); *C08J 3/11* (2013.01); *C08K 3/36* (2013.01); *C08K 9/02* (2013.01);
(Continued)

(58) Field of Classification Search
CPC ... C01B 33/18; C08J 3/11; C08K 3/36; C08K 9/02; C01P 2002/02
See application file for complete search history.

(56) References Cited

U.S. PATENT DOCUMENTS 4,853,198 A 8/1989 Orii et al.
5,827,524 A 10/1998 Hagiwara et al.
(Continued)

FOREIGN PATENT DOCUMENTS

JP S61-58822 A 3/1986
JP S63-233008 A 9/1988
(Continued)

OTHER PUBLICATIONS

International Search Report dated Jun. 6, 2017 in PCT/JP2017/016495 (w/ English translation).
(Continued)

*Primary Examiner* — Melvin C. Mayes
*Assistant Examiner* — Michael Forrest
(74) *Attorney, Agent, or Firm* — Oblon, McClelland, Maier & Neustadt, L.L.P.

(57) ABSTRACT

A crystalline silica particulate material contains zinc (Zn) in an amount of 1 ppm or more, exhibits a volume average particle diameter of 200 μm or less, and is composed mainly of crystalline silica.

17 Claims, 3 Drawing Sheets

(51) Int. Cl.
*C08K 9/02* (2006.01)
*C01B 33/18* (2006.01)

(52) U.S. Cl.
CPC ...... *C01P 2002/02* (2013.01); *C01P 2004/03* (2013.01); *C01P 2004/60* (2013.01); *C08J 2300/22* (2013.01); *C08J 2300/24* (2013.01)

(56) References Cited

U.S. PATENT DOCUMENTS

| | | |
|---|---|---|
| 5,958,127 A | 9/1999 | Bomal et al. |
| 6,146,454 A | 11/2000 | Bomal et al. |
| 6,403,201 B1 | 6/2002 | Otagiri et al. |
| 2015/0284254 A1 | 10/2015 | Jiang et al. |
| 2017/0267900 A1* | 9/2017 | Sato ................. C01B 33/18 |

FOREIGN PATENT DOCUMENTS

| | | |
|---|---|---|
| JP | H2-022119 A | 1/1990 |
| JP | H5-193926 A | 8/1993 |
| JP | H8-188670 A | 7/1996 |
| JP | H10-504011 A | 4/1998 |
| JP | 2001-003034 A | 1/2001 |
| JP | 2001-111185 A | 4/2001 |
| JP | 2002-020111 A | 1/2002 |
| JP | 2002-154818 A | 5/2002 |
| JP | 2008-162849 A | 7/2008 |
| JP | 2014-196226 A | 10/2014 |
| JP | 2015-078105 A | 4/2015 |
| WO | WO 2016/031823 A1 | 3/2016 |

OTHER PUBLICATIONS

Written Opinion of ISA dated Jun. 6, 2017 in PCT/JP2017/016495 (w/ Partial machine English translation).
Written Opinion of IPEA dated May 15, 2018 in PCT/JP2017/016495 (w/ Partial machine English translation).
Decision to Grant dated Jun. 28, 2018 in Japanese Patent Application No. 2018-514656 (w/ machine English translation).

* cited by examiner

CRYSTALLINE SILICA PARTICULATE MATERIAL AND PRODUCTION PROCESS FOR THE SAME AS WELL AS CRYSTALLINE SILICA PARTICULATE MATERIAL-CONTAINING SLURRY COMPOSITION AND CRYSTALLINE SILICA PARTICULATE MATERIAL-CONTAINING RESINOUS COMPOSITION

CROSS REFERENCE TO RELATED APPLICATIONS

The present application is a Continuation Application of International Application No. PCT/JP2017/016495, filed on Apr. 26, 2017, which is incorporated herein by reference. The present invention is based on Japanese Patent Application No. 2016-91877, filed on Apr. 28, 2016, the entire contents of which are incorporated herein by reference.

BACKGROUND OF THE INVENTION

1. Field of the Invention

The present invention relates to a crystalline silica particulate material and a production process for the same, as well as to a crystalline silica particulate material-containing slurry composition and a crystalline silica particulate material-containing resinous material.

2. Description of the Related Art

As a method of turning amorphous silica into crystalline silica by crystallizing the amorphous silica, Japanese Unexamined Patent Publication (KOKAI) Gazette No. 61-58822, Japanese Unexamined Patent Publication (KOKAI) Gazette No. 63-233008, and Japanese Unexamined Patent Publication (KOKAI) Gazette No. 2001-003034 disclose commonly-known methods in which a considerable amount of an alkali metal or alkaline-earth metal component is added to amorphous silica and then the resulting mixture is heated. These methods have brought about purposes to which the produced crystalline silica cannot be applied as a raw material, because they are adversely affected by the alkali metal or alkaline-earth metal component that has been left in the produced crystalline silica in a large amount.

Moreover, Japanese Unexamined Patent Publication (KOKAI) Gazette No. 2-022119, and Japanese Unexamined Patent Publication (KOKAI) Gazette No. 2002-154818 disclose the following commonly-known methods, respectively: a method of adding alkali metal fluoride to amorphous silica; and a method of adding halogenated aluminum or halogenated calcium to amorphous silica. However, the use of halogen makes the cause for environmental pollutions, leading likewise to posing the problem of limited purposes.

In addition, Japanese Unexamined Patent Publication (KOKAI) Gazette No. 5-193926 discloses another commonly-known method in which amorphous silica particles enclosing cristobalite particles in the interior are subjected to a heating treatment. However, the method is low in the productivity, because it necessitates two extra steps, namely, an extra step of preliminarily producing cristobalile particles each making a seed crystal, and the other extra step of synthesizing amorphous silica so as to enclose the resultant cristobalite particles.

Moreover, Japanese Unexamined Patent Publication (KOKAI) Gazette No. 2008-162849 discloses commonly-known high-purity cristobalite particles in which a metal selected from the group consisting of aluminum (Al), magnesium (Mg) and titanium (Ti), and/or an oxide of the same, exists in an amount of from 200 to 2,000 ppm by metallic conversion on some of the surface or on the entire surface. A method for producing the high-purity cristobalite particles, however, has left room for improvement, because it is adversely affected by a large addition amount of the metals required, and by a large remaining amount of metallic impurities.

SUMMARY OF THE INVENTION

The present invention has been made in view of the aforementioned circumstances. It is therefore an object of the present invention to provide a crystalline silica particulate material with a composition distinct from those of conventional crystalline silica particulate materials, and a production process for the same, as well as a crystalline silica particulate material-containing resinous composition comprising the crystalline silica particulate material.

(1) A crystalline silica particulate material according to the present invention achieving the aforementioned object contains zinc (Zn) in an amount of 1 ppm or more, exhibits a volume average particle diameter of 200 μm or less, and is composed mainly of crystalline silica. Note that the present crystalline silica particulate material preferably contains aluminum (Al) in an amount of less than 200 ppm, but excludes crystalline particulate materials containing Al in an amount of 400 ppm or more.

The crystalline silica particulate material according to the present invention can be used for the purposes of particulate materials comprising ordinary silica, because it can demonstrate the natures of silica as a whole even when it contains zinc. Moreover, it is also possible to think of providing the present crystalline silica particulate material with catalytic activities by utilizing the zinc contained in and/or on the surface.

The above-described present crystalline silica particulate material according to Item (1) can be combined with at least one of the following constituent elements according to Items (2) and (3) described below.

(2) The present crystalline silica particulate material satisfactorily exhibits a circularity degree of 0.9 or more, or 0.97 or more preferably. Note that the present silica particulate material adequately further exhibits a crystallization degree of 80% or more. The present crystalline silica material with a high circularity degree yields upgraded particulate packability.

(3) The present crystalline silica particulate material satisfactorily further comprises uranium (U) and thorium (Th), wherein a content of at least one of the U and Th is 20 ppb or less. The present crystalline silica particulate material, which thus includes U and/or Th and which is used in a packing agent for semiconductor-device sealing material, allows reducing soft errors that result from α rays emitted from the U and/or Th. Specifically, the present crystalline silica particulate material emits an α ray preferably in a dose of 0.01 $c/cm^2 \cdot h$ or less, more preferably in a dose of 0.005 $c/cm^2 \cdot h$ or less, or much more preferably in a dose of 0.002 $c/cm^2 \cdot h$ or less.

(4) A crystalline silica particulate material-containing resinous composition according to the present invention achieving the aforementioned object comprises the above-described present crystalline silica particulate material, and a resinous material dispersing the crystalline silica particulate material.

(5) A production process for crystalline silica particulate material according to the present invention achieving the aforementioned object comprises an adhesion step of adhering zinc, or a compound containing zinc, onto a surface of a particulate ingredient comprising amorphous silica; and a crystallization step of subsequently heating the particulate ingredient undergone the adhesion step at a temperature of from 1,000° C. to 1,500° C., thereby crystallizing the particulate ingredient. Note that the particulate ingredient preferably exhibits a circularity degree of 0.9 or more. Moreover, in the crystallization step, the particulate ingredient is preferably crystallized in an amount of 50% by mass or more while keeping up the circularity degree at 0.9 or more.

The present production process allows, without ever changing the particulate ingredient comprising amorphous silica in the form too much, a smooth development of the crystallization in the particulate ingredient which is made into a raw material by the adhesion of zinc.

(6) A production process for crystalline silica particulate material according to the present invention achieving the aforementioned object comprises a preparation step of preparing a particulate ingredient comprising amorphous silica, and containing zinc; and a crystallization step of subsequently heating the prepared particulate ingredient at a temperature of from 1,000° C. to 1,500° C., thereby crystallizing the particulate ingredient.

As a raw material serving as zinc or a compound containing zinc, the present production process for crystalline silica particulate material employs the ingredient which is decomposed, evaporated and/or sublimed by heating at a temperature of from 1,000° C. to 1,500° C. Using the ingredient allows considerably reducing zinc, which remains in the resulting crystalline silica particulate material, relative to the addition amount.

DESCRIPTION OF THE EMBODIMENTS

Figure 1:
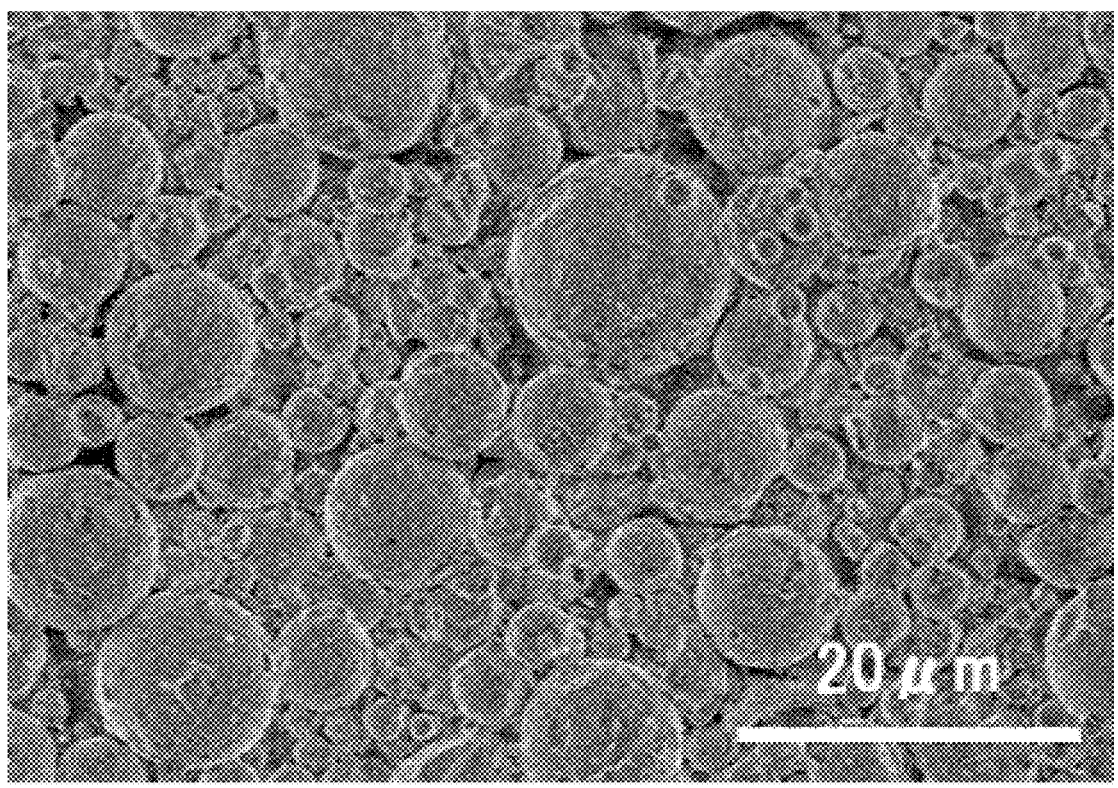
FIG. 1 is an SEM photograph of a crystalline silica particulate material according to First Example.

A crystalline silica particulate material according to the present invention, and a production process for the same, as well as a resinous composition containing the crystalline silica particulate material will be hereinafter described in detail based on an embodiment mode. Although the production process for crystalline silica particulate material according to the present embodiment mode is a process suitable for producing the crystalline silica particulate material according to the present embodiment mode, it is not at all a process dedicated for producing the crystalline silica particulate material according to the present embodiment mode alone. For example, although the crystalline silica particulate material according to the present embodiment mode has a particle diameter of 200 μm or less, the production process for crystalline silica particulate material according to the present embodiment mode, which is applied to particulate ingredients with a particle diameter of more than 200 μm as well, enables the crystallization of the particulate ingredients to progress while preserving or retaining their forms.

Crystalline Silica Particulate Material

The crystalline silica particulate material according to the present embodiment mode contains zinc (Zn) in an amount of 1 ppm or more, has a volume average particle diameter of 200 μm or less, and is composed mainly of crystalline silica. The zinc not only exists satisfactorily over the entire particles uniformly, but also exists properly in and/or on the surface unevenly. The zinc is not limited especially in the existing form, and can exist as the oxide, chloride, sulfide or hydroxide. The zinc is especially contained preferably in an amount of 5 ppm or more, or more preferably in an amount of 10 ppm or more. Moreover, a feasible content of the zinc also involves 100 ppm or more, 200 ppm or more, 500 ppm or more, or 1,000 ppm or more.

The phrase, "composed mainly of crystalline silica," means that crystalline silica is contained in an amount of 50% by mass or more. A preferable content of the crystalline silica involves 60% by mass or more, 70% by mass or more, or 80% by mass or more.

An upper limit of the particle diameter to be given herein involves 150 μm, 100 μm, 50 μm, 30 μm, 20 μm, 10 μm, 5 μm, 3 μm, 2 μm, or 1 μm. In addition to a judgment of the particle diameter by the particle diameters of individual particles, the particle diameter can be judged by the $D_{50}$ or volume average particle diameter.

A preferable value of the circularity degree is 0.9 or more, a more preferable value is 0.95 or more, or a much more preferable value is 0.99 or more. The circularity degree is measured in the following manner: a photograph of the crystalline silica particulate material is taken by SEM; a value is computed for arbitrary or discretionary 30 of the observed particles as a circularity degree of each of the particles from the area and circumferential length of the particles using an equation, (Circularity Degree)=(Circumferential Length of True Circle having Area Equal to that of Particle)÷(Circumferential Length of Particle); and an averaged value of the resultant values is adopted as a circularity degree of the crystalline silica particulate material.

A preferable upper limit of the content of uranium (U) and thorium (Th) involves 20 ppb, 10 ppb, 5 ppb, or 1 ppb for both of them. At least one of the contents of the U and Th is preferably restricted to one of these upper-limit values, for example, to 20 ppb. Even a sum total of the contents of the U and Th is more preferably set at one of the upper-limit values or less.

Production Process for Crystalline Silica Particulate Material

A production process for crystalline silica particulate material according to the present embodiment mode comprises an adhesion step, and a heating step. The adhesion step is a step of adhering zinc or a zinc-containing compound (or zinc ingredient) onto a surface of a particulate ingredient comprising amorphous silica.

An adopted particulate ingredient comprising amorphous silica involves those which is provided with a particle size distribution, average particle diameter or circularity degree that a crystalline silica particulate material to be produced is sought to exhibit, because a form of the particulate ingredient is reflected or reproduced in a form of the crystalline silica particulate material to be produced. For example, the following methods are adopted preferably: a method called a deflagration method (or VMC method) in which silica is produced by charging a powder of metallic silicon into a flame together with oxygen; or a method called a fusion method in which silica particles are produced by charging silica into a flame to fuse it and cooling it afterward. The VMC method or fusion method makes it feasible to prepare the particulate ingredient comprising amorphous silica whose circularity degree is high. Moreover, the VMC method or fusion method, in which the particle diameter and supply rate of metallic silicon, the mixing rate of metallic silicon to oxygen, and so on, are controlled, allows controlling the particle diameter or particle size distribution of a generating particulate ingredient. In addition, the VMC method is a preferable option, because it involves metallic silicon, which ensures acquiring a high-purity raw material, as one of the raw materials so that upgrading the purity of metallic silicon permits upgrading the purity of an obtainable particulate ingredient comprising amorphous silica. Moreover, the following also make it feasible to contain zinc within an obtainable particulate ingredient comprising amorphous silica: subjecting raw-material metallic silicon with zinc included, or a mixture of zinc and metallic silicon, to the VMC method; or subjecting a mixture of zinc and metallic to the fusion method. If such is the case, without ever adopting the adhesion step, it is even feasible to acquire the crystalline silica particulate material by subjecting the metallic-silicon raw material itself directly to the heating step.

An exemplifiable zinc ingredient (i.e., simple zinc or zinc-containing compound) involves a powder or solution of one of the following: zinc, zinc oxides, zinc hydroxides, zinc salts, zinc complexes, metallic alkoxides of zinc. Note herein that the term, "solution," is a concept including slurries or colloids in which the powder is suspended. Moreover, the solution adopts such a proper solvent as water or alcohol.

The heating step is a step in which, after the zinc ingredient has been adhered onto a surface of the particulate ingredient comprising amorphous silica, the particulate ingredient with the zinc ingredient adhered is heated at a temperature falling in a range of from 1,000° C. to 1,500° C. The heating temperature is set up at a temperature at which the crystallization of the particulate ingredient comprising amorphous silica progresses. Although the heating step is carried out until the particulate ingredient comprising silica attains a required degree of crystallinity, it is preferably carried out for such a period of time, whose upper limit is set so as to involve 10 hours, 5 hours or 3 hours approximately, from the viewpoint of productivity. Although a specific apparatus or method for carrying out the heating step is not limited especially, an adoptable apparatus or method involves such publicly-known apparatuses or methods as batched or continuous gas furnaces, electric furnaces, and rotary kilns.

The crystalline silica particulate material obtained via the heating step might possibly agglomerate. Although the agglomeration is disintegrable or crushable to a certain extent as the crystalline silica particulate material undergoes treatments following the heating step, the crystalline silica particulate material is preferably disintegrated or crushed (or broken into pieces) actively to the primary particles through a disintegration or crush step furnished subsequently to the heating step. Specifically, a preferable method of disintegrating or crushing involves methods in which a shear force is applied to agglomerated primary particles using a pulverizer or mixer. For example, it is possible to name a method of processing the crystalline silica particulate material with a jet or fluid-energy mill.

Crystalline Silica Particulate Material-containing Resinous Composition

A crystalline silica particulate material-containing resinous composition according to the present embodiment mode comprises the above-described crystalline silica particulate material, and a resinous material dispersing the crystalline silica particulate material. Although the resinous material is not limited especially, an exemplifiable resinous material involves thermoplastic resins, such as polyolefin, polyester and polyamide, and thermosetting resins, such as epoxy resins. In compliance with adopted resins, surface treatments can be carried out to the crystalline silica particulate material. One of the surface treatments allows the adoption of a silane coupling agent, and is carried out in order to upgrade the affinity between the crystalline silica particulate material and the resinous material, for instance.

EXAMPLES (1) First Through Fifth Examples

The following raw materials were made ready for the preparation of crystalline silica particulate materials according to First through Fifth Examples: a particulate ingredient comprising amorphous silica whose concentration of each of uranium (U) and thorium (Th) was 5 ppb or less; and a 30%-by-mass zinc acrylate aqueous solution. Note that the particulate ingredient was molten or fused silica that was produced by ADMATEX Co., Ltd, and which had a volume average particle diameter of 7.0 µm and a circularity degree of 0.99. With respect to 100 parts by mass of the particulate ingredient, the zinc acrylate aqueous solution was added to and mixed with the particulate ingredient by a mixer so as to make the zinc acrylate aqueous solution account for 0.4 parts by mass for First Example, 0.8 parts by mass for Second Example, 1.2 parts by mass for Third Example, 1.6 parts by mass for Fourth Example, and 2.0 parts by mass for Fifth Example.

The resulting mixtures were dried, and were thereafter heated in a heating furnace. The mixtures were subjected to the following heating conditions in which they were heated from ordinary or room temperature to 1,380° C., were held at 1,380° C. for four hours, and were then left to cool to room temperature. The thus obtained samples were disintegrated or crushed (or broken into pieces) to prepare test samples according to First through Fifth Examples.

(2) Sixth Through Eighth Examples

Instead of the zinc acrylate aqueous solution, a 25%-by-mass zinc oxide alcohol slurry was used so as to make the zinc oxide alcohol slurry account for 1.0 part by mass for Sixth Example, 2.0 parts by mass for Seventh Example, and 4.0 parts by mass for Eighth Example, with respect to 100 parts by mass of the particulate ingredient. Except the use of the zinc oxide alcohol slurry, test samples according to Sixth through Eighth Examples were prepared by making the samples under the same conditions as those for First through Fifth Examples.

(3) Comparative Example No. 1

Except that no zinc ingredient was added, and that the particulate ingredient comprising amorphous silica was used as it was, test samples according to Comparative Example No. 1 were prepared by making the samples under the same conditions as those for the First through Fifth Examples.

(4) Measurements

Figure 2:
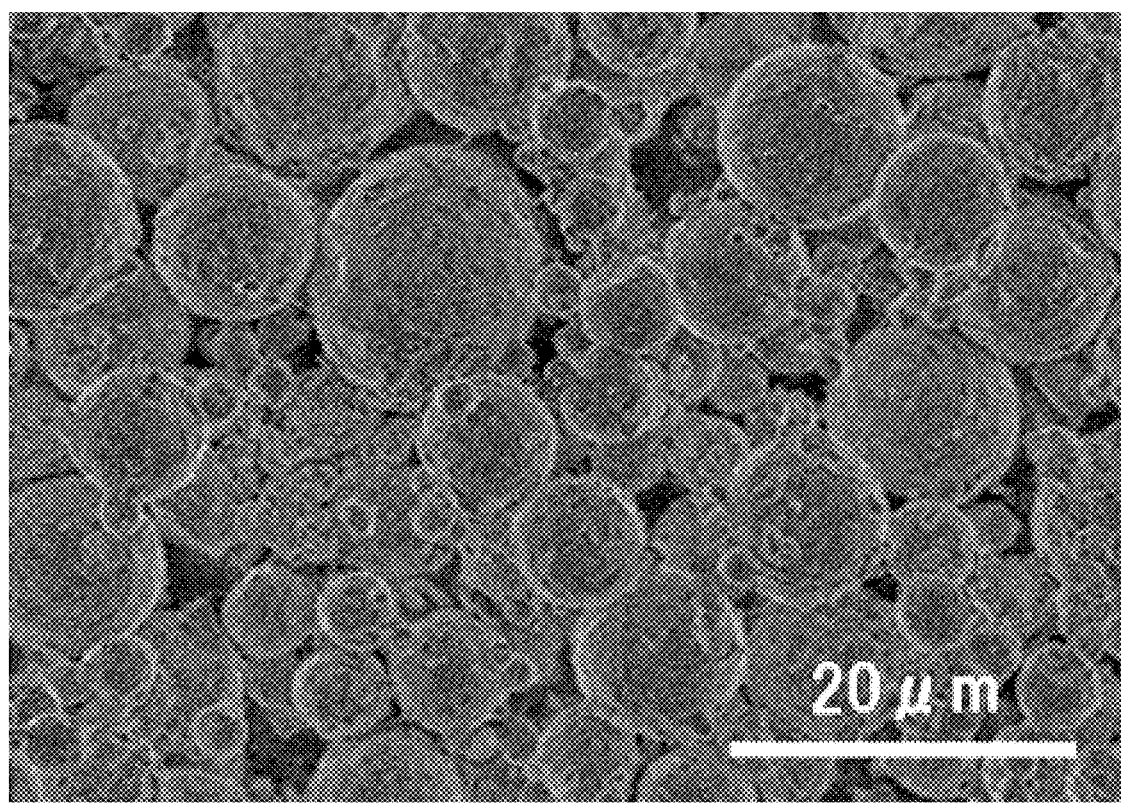
FIG. 2 is an SEM photograph of a crystalline silica particulate material according to Sixth Example.
Figure 3:
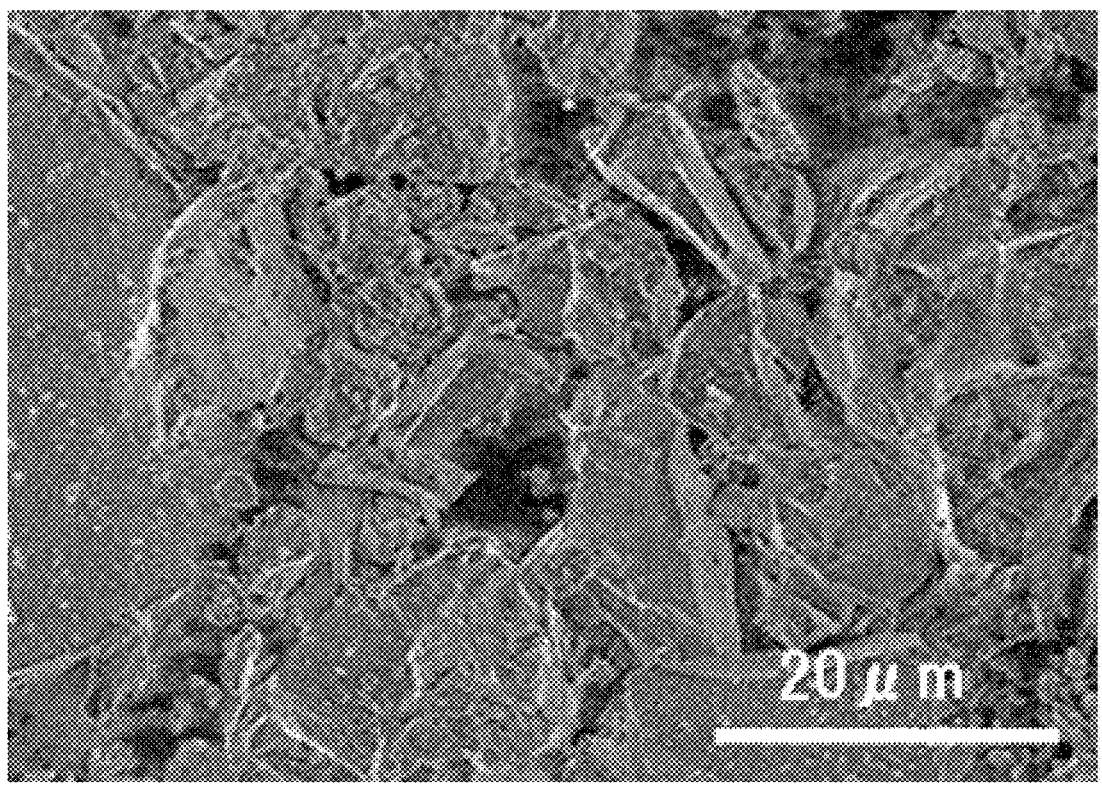
FIG. 3 is an SEM photograph of a crystalline silica particulate material according to First Comparative Example.

The test samples according to First through Eighth Examples and Comparative Example No. 1 were measured for the following characteristics: the X-ray diffraction (or XRD); the circularity degree; the true density; the volume average particle diameter and maximum particle diameter with a wet-type laser diffraction/scatter particle-size distribution measurement apparatus; the zinc content by inductively-coupled plasma atomic emission spectrometry (or ICP-AES); and the uranium and thorium contents with an inductively-coupled plasma mass spectrometer (or ICP-MS). Table 1 below gives the thus measured results. Moreover, FIGS. 1, 2 and 3 show an SEM photograph according to First Example, Sixth Example and Comparative Example No. 1, respectively.

TABLE 1

| Sample Arrangement | 1st Ex. | 2nd Ex. | 3rd Ex. | 4th Ex. | 5th Ex. | 6th Ex. | 7th Ex. | 8th Ex. | Comp. Ex. No. 1 |
|---|---|---|---|---|---|---|---|---|---|
| Spherical Amorphous Silica (parts by mass) | 100 | 100 | 100 | 100 | 100 | 100 | 100 | 100 | 100 |
| 30%-by-Mass Zinc Acrylate Aqueous Solution (parts by mass) | 0.4 | 0.8 | 1.2 | 1.6 | 2.0 | None | None | None | None |
| 25%-by-Mass Zinc Oxide Alcohol Slurry (parts by mass) | None | None | None | None | None | 1.0 | 2.0 | 4.0 | None |
| Conversion into Zinc (ppm) | 380 | 760 | 1,100 | 1,500 | 1,900 | 1,900 | 3,800 | 7,700 | None |
| Max. Temp. (° C.) | 1,380 | 1,380 | 1,380 | 1,380 | 1,380 | 1,380 | 1,380 | 1,380 | 1,380 |
| Retention Time (hour) | 4 | 4 | 4 | 4 | 4 | 4 | 4 | 4 | 4 |

| Measurement Result | 1st Ex. | 2nd Ex. | 3rd Ex. | 4th Ex. | 5th Ex. | 6th Ex. | 7th Ex. | 8th Ex. | Comp. Ex. No. 1 |
|---|---|---|---|---|---|---|---|---|---|
| XRD Waveform | Cristobalite | Cristobalite | Cristobalite | Cristobalite | Cristobalite | Cristobalite | Cristobalite | Cristobalite | Amorphous & Cristobalite |
| Crystallization Degree (%) | 95 | 95 | 96 | 94 | 96 | 100 | 97 | 100 | 7 |
| True Density (g/cm$^3$) | 2.32 | 2.32 | 2.32 | 2.32 | 2.32 | 2.32 | 2.32 | 2.33 | 2.25 |
| Circularity Degree | 0.96 | 0.95 | 0.97 | 0.97 | 0.96 | 0.95 | 0.96 | 0.96 | Not Applicable |
| Average Particle Diameter (μm) | 7.2 | 7.6 | 6.9 | 7.3 | 6.8 | 7.4 | 7.6 | 7.4 | Not Applicable |
| Maximum Particle Diameter (μm) | 20 | 20 | 20 | 20 | 20 | 20 | 20 | 20 | Not Applicable |
| Zn Content (ppm) | 19 | 17 | 25 | 24 | 48 | 370 | 640 | 4,000 | 0.0 |
| U content (ppb) | 2.0 | 1.9 | 0.8 | 1.8 | 1.5 | 0.8 | 3.7 | 2.8 | 2.0 |
| Th Content (ppb) | 0.4 | 0.4 | 0.3 | 0.6 | 0.6 | 0.4 | 1.0 | 0.9 | 1.3 |

As can be evident from Table 1, the results of First through and Eighth Examples and Comparative Example No. 1 lead to the understanding that the addition of zinc to a particulate ingredient comprising amorphous silica, and the application of heat to the particulate ingredient with zinc added turn the particulate ingredient into a crystalline silica particulate material (e.g., cristobalite), and that the addition of zinc, and the application of heat also allow the particulate ingredient to crystalize while sustaining the high degree of circularity. The latter understanding is apparent from the fact that the crystalline silica particulate materials according to First and Sixth Examples had a higher degree of circularity than did the crystalline silica particulate material according to Comparative Example No. 1, as shown in FIGS. 1, 2 and 3. Moreover, the outcomes of First through Eighth Example proved that the zinc addition, which falls in a range of from 380 ppm to 7,700 ppm based on the mass of a particulate ingredient comprising amorphous silica, fully produces the advantageous effect, the crystallization during which the sphericity is retained. In addition, the amount of zinc, which remained in the obtained crystalline silica particulate materials, was found to become less relative to the addition amounts. In particular, it is worth noticing especially that the crystalline silica particulate materials, which were prepared using the zinc acrylate aqueous solution, had remained zinc in a considerably lessened amount. Moreover, the results of Comparative Example No. 1 revealed that the heating at 1,380° C. does not allow the crystallization to fully progress in the crystalline silica particulate material comprising the particulate ingredient that is composed of amorphous silica alone.

The measured values of the zinc contents and crystallization degrees for First through Fifth Examples and Comparative Example No. 1 were respectively plotted against the x-axis and y-axis of a graph, computing a logarithmic approximation equation showing the relationship between the two values. The approximation equation was turned out to be "$y=13.65 \times \ln(x)+51.59$." The approximation equation allows computing a zinc content required for sufficient crystallization, because the squared R value, a determination coefficient, for the approximation equation was found to be 0.958 that coincided very well with the measured results. As a consequence, the zinc contents of 1 ppm, 5 ppm, and 10 ppm were found out to yield the crystallization degrees of 52%, 74%, and 83%, respectively.

INDUSTRIAL APPLICABILITY

The crystalline silica particulate material according to the present invention not only contains zinc but also comprises particles having the natures of silica. Thus, in addition to being utilizable for the same purposes as those for which ordinary particulate materials comprising crystalline silica have been utilized, the present crystalline silica particulate material allows the contained zinc to produce the advantageous effects as well.

The production process for crystalline silica particulate material according to the present invention allows producing a crystalline silica particulate material in which the form of a particulate ingredient comprising amorphous silica (i.e., one of the raw materials) is held virtually unchanged. For example, the present production process simplifies the production of a spherical crystalline silica particulate material, because amorphous silica is likely to be produced as a spherical shape.

What is claimed is:

1. A crystalline silica particulate material, containing zinc (Zn) in an amount of 1 ppm or more, exhibiting a volume average particle dimeter of 200 μm or less, exhibiting a circularity degree of 0.9 or more, composed mainly of crystalline silica, and excluding crystalline silica particulate materials containing aluminum (Al) in an amount of 400 ppm or more.

2. The crystalline silica particulate material according to claim 1, wherein a content of at least one of U and Th is 20 ppb or less.

3. The crystalline silica particulate material according to claim 1, wherein the crystalline silica particulate material has undergone a surface treatment with at least one member selected from the group consisting of silazanes and silane coupling agents.

4. A crystalline silica particulate material-containing slurry composition comprising:
the crystalline silica particulate material according to claim 1; and
a solvent dispersing the crystalline silica particulate material.

5. A crystalline silica particulate material-containing resinous composition comprising:
the crystalline silica particulate material according to claim 1; and
a resinous material dispersing the crystalline silica particulate material.

6. A crystalline silica particulate material, containing aluminum (Al) in an amount of less than 200 ppm, containing zinc (Zn) in an amount of 1 ppm or more, exhibiting a volume average particle dimeter of 200 μm or less, exhibiting a circularity degree of 0.9 or more, and composed mainly of crystalline silica.

7. The crystalline silica particulate material according to claim 6, wherein a content of at least one of U and Th is 20 ppb or less.

8. The crystalline silica particulate material according to claim 6, wherein the crystalline silica particulate material has undergone a surface treatment with at least one member selected from the group consisting of silazanes and silane coupling agents.

9. A crystalline silica particulate material-containing slurry composition comprising:
the crystalline silica particulate material according to claim 6; and
a solvent dispersing the crystalline silica particulate material.

10. A crystalline silica particulate material-containing resinous composition comprising:
the crystalline silica particulate material according to claim 6; and
a resinous material dispersing the crystalline silica particulate material.

11. A crystalline silica particulate material, containing zinc (Zn) in an amount of 1 ppm or more, exhibiting a volume average particle dimeter of 200 μm or less, exhibiting a circularity degree of 0.97 or more, composed mainly of crystalline silica, and exhibiting a crystallization degree of 80% or more.

12. The crystalline silica particulate material according to claim 11, wherein a content of at least one of U and Th is 20 ppb or less.

13. The crystalline silica particulate material according to claim 11, wherein the crystalline silica particulate material has undergone a surface treatment with at least one member selected from the group consisting of silazanes and silane coupling agents.

14. A crystalline silica particulate material-containing slurry composition comprising:
the crystalline silica particulate material according to claim 11; and
a solvent dispersing the crystalline silica particulate material.

15. A crystalline silica particulate material-containing resinous composition comprising:
the crystalline silica particulate material according to claim 11; and
a resinous material dispersing the crystalline silica particulate material.

16. A production process for crystalline silica particulate material, the production process comprising:
an adhesion step of adhering zinc, or a compound containing zinc, onto a surface of a particulate ingredient comprising amorphous silica and exhibiting a circularity degree of 0.9 or more; and
a crystallization step of subsequently heating the particulate ingredient undergone the adhesion step at a temperature of from 1,000° C. to 1,500° C., thereby crystallizing the particulate ingredient in an amount of 50% by mass or more while keeping up the circularity degree at 0.9 or more.

17. A production process for crystalline silica particulate material, the production process comprising:
a preparation step of preparing a particulate ingredient comprising amorphous silica, containing zinc and exhibiting a circularity degree of 0.9 or more; and a crystallization step of subsequently heating the prepared particulate ingredient at a temperature of from 1,000° C. to 1,500° C., thereby crystallizing the particulate ingredient in an amount of 50% by mass or more while keeping up the circularity degree at 0.9 or more.

* * * * *